US012692026B2

(12) United States Patent　(10) Patent No.:　US 12,692,026 B2

Durand et al.　(45) Date of Patent:　Jul. 28, 2026

(54) SPACE MODULE DESIGNED TO BE DEPLOYED IN SPACE TO FORM A SPACE PLATFORM AND ASSOCIATED SPACE PLATFORM

(71) Applicant: THALES, Meudon (FR)

(72) Inventors: Gautier Durand, Cannes la Bocca (FR); Yves Durand, Cannes la Bocca (FR)

(73) Assignee: THALES, Meudon (FR)

( * ) Notice: Subject to any disclaimer, the term of this patent is extended or adjusted under 35 U.S.C. 154(b) by 0 days.

(21) Appl. No.: 19/236,939

(22) Filed: Jun. 12, 2025

(65) Prior Publication Data

US 2025/0382071 A1　Dec. 18, 2025

(30) Foreign Application Priority Data

Jun. 13, 2024　(FR) ...................................... 2406259

(51) Int. Cl.
B64G 1/22　(2006.01)

(52) U.S. Cl.
CPC ..................................... B64G 1/223 (2023.08)

(58) Field of Classification Search
CPC ................................ B64G 1/223; B64G 1/503
See application file for complete search history.

(56) References Cited

U.S. PATENT DOCUMENTS

| | | | | | |
|---|---|---|---|---|---|
| 3,817,320 | A | * | 6/1974 | Williams | ................. B64G 1/50 165/47 |
| 4,588,151 | A | * | 5/1986 | Mori | ........................ B64G 1/44 244/172.6 |
| 4,872,625 | A | * | 10/1989 | Filley | ........................ B64G 1/12 244/159.4 |
| 5,052,640 | A | * | 10/1991 | Chang | .................... B64G 1/002 244/172.7 |
| 5,372,183 | A | * | 12/1994 | Strickberger | .......... B64G 1/503 165/41 |
| 5,386,953 | A | * | 2/1995 | Stuart | ...................... B64G 1/44 244/158.4 |
| 5,527,001 | A | * | 6/1996 | Stuart | ................. B64G 1/2224 244/172.6 |
| 5,732,765 | A | * | 3/1998 | Drolen | ..................... B64G 1/50 165/41 |
| 5,794,891 | A | * | 8/1998 | Polle | ...................... B64G 1/503 244/164 |

(Continued)

FOREIGN PATENT DOCUMENTS

| | | |
|---|---|---|
| CN | 117382912 A | 1/2024 |
| EP | 1101699 A2 | 5/2001 |
| EP | 1101699 A3 | 5/2001 |

OTHER PUBLICATIONS

FR 2406259, INPI Rapport de Recherche Preliminaire, Dec. 16, 2024, 2 pages.

*Primary Examiner* — Joshua J Michener
*Assistant Examiner* — Michael B. Kreiner
(74) *Attorney, Agent, or Firm* — Soquel Group LLC

(57) ABSTRACT

A space module designed to be deployed in space to form a space platform, the space module being formed of a predetermined number of elements all having the same flat shape in an extension plane of the corresponding element, each element being of a predetermined type, with at least one element forming a payload.

14 Claims, 8 Drawing Sheets

(56)                    References Cited

U.S. PATENT DOCUMENTS

| | | | | |
|---|---|---|---|---|
| 5,931,420 | A * | 8/1999 | Yamato | B64G 1/223 |
| | | | | 244/159.5 |
| 6,318,674 | B1 * | 11/2001 | Simburger | B64G 1/2227 |
| | | | | 244/172.7 |
| 6,536,712 | B1 * | 3/2003 | Barenett | B64G 1/10 |
| | | | | 244/158.3 |
| 6,568,638 | B1 * | 5/2003 | Capots | B64G 1/2224 |
| | | | | 244/159.4 |
| 7,156,349 | B2 * | 1/2007 | Nakasuka | B64G 1/10 |
| | | | | 244/172.7 |
| 7,478,782 | B2 * | 1/2009 | Huang | B64G 1/10 |
| | | | | 244/159.4 |
| 8,146,867 | B2 * | 4/2012 | Jordan | B64G 1/428 |
| | | | | 244/159.4 |
| 9,278,765 | B2 * | 3/2016 | Stokes | B64G 1/52 |
| 10,177,460 | B2 * | 1/2019 | Cosner | H01Q 21/0018 |
| 10,435,183 | B1 * | 10/2019 | Schwarz | B64G 1/40 |
| 10,532,830 | B2 * | 1/2020 | Busche | B64G 1/10 |
| 10,661,918 | B2 * | 5/2020 | Schwarz | B64G 1/2221 |
| 11,021,223 | B2 * | 6/2021 | Fikes | B64G 1/1085 |
| 11,414,220 | B2 * | 8/2022 | Izu | B64G 1/503 |
| 11,787,572 | B1 * | 10/2023 | Thompson | B64G 1/645 |
| | | | | 244/173.3 |
| 11,878,820 | B1 * | 1/2024 | Thompson | B64G 1/643 |
| 12,006,071 | B1 * | 6/2024 | Allison | F28D 15/04 |
| 12,110,131 | B2 * | 10/2024 | Ekblaw | B64G 1/22 |
| 2002/0134423 | A1 | 9/2002 | Eller et al. | |
| 2005/0230558 | A1 | 10/2005 | Nakasuka | |
| 2006/0105706 | A1 | 5/2006 | Huang et al. | |
| 2017/0361948 | A1 | 12/2017 | Lumaca et al. | |
| 2018/0297724 | A1 * | 10/2018 | Harvey | B64G 1/223 |
| 2022/0081131 | A1 | 3/2022 | Schwarz | |
| 2025/0206468 | A1 * | 6/2025 | Palisoc | B64G 1/2225 |

* cited by examiner

<u>FIG.2</u>

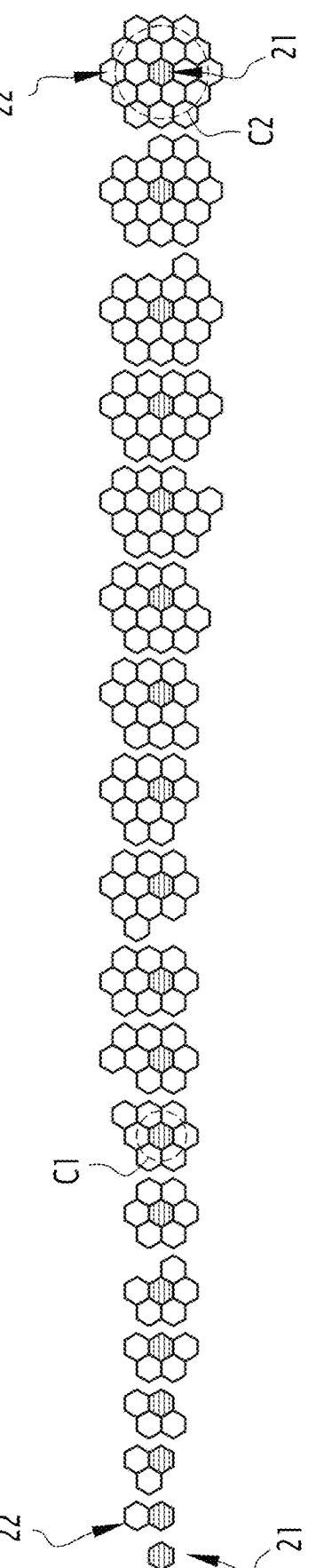
FIG.5

SPACE MODULE DESIGNED TO BE DEPLOYED IN SPACE TO FORM A SPACE PLATFORM AND ASSOCIATED SPACE PLATFORM

REFERENCE TO RELATED APPLICATION

This application is a U.S. non-provisional application claiming the benefit of French Patent Application No. 24 06259 filed on Jun. 13, 2024, the contents of which are incorporated herein by reference in their entirety.

TECHNICAL FIELD OF THE INVENTION

The present invention relates to a space module designed to be deployed in space to form a space platform. The invention also relates to such a space platform.

The invention is in the field of large orbital structures, usable for different purposes.

BACKGROUND OF THE INVENTION

The known prior art in the field of such orbital structures is mainly based on functional architectures like the ISS ("International Space Station").

In such an architecture, the different subsystems composing it are assembled on a support structure. The attitude of this structure is generally controlled by actuators such as CMG ("Control Momentum Gyroscope") or reaction wheels, which have the disadvantage of representing a significant mass, or even by thrusters that present the disadvantage of consuming propellants.

This type of architecture therefore quickly presents limitations when the dimensions become large, of the order of several hundred meters. These limitations are notably expressed in terms of controllability as well as mass.

More particularly, the ISS-type architecture presents a functional and centralized architecture that presents disadvantages in mass optimization and the distance between different functions. This then leads to losses, for example, in thermal dissipation on power chains. This type of architecture also presents attitude control difficulties mainly due to significant flexions linked to the large dimensions exposed to solar flux.

As a result, existing architectures cannot be used when it is necessary to increase these dimensions to be able to ensure functions not currently provided.

SUMMARY OF THE INVENTION

The present invention has as its object to overcome these disadvantages and propose a solution that allows for easily increasing the dimensions of a space platform while ensuring its attitude controllability.

To this end, the invention has as its object a space module intended to be deployed in space to form a space platform, the space module being formed of a predetermined number of elements all having the same flat shape in an extension plane of the corresponding element, each element being of a predetermined type, with at least one element forming a payload.

According to other advantageous aspects of the invention, the module includes one or more of the following features, taken alone or in any technically possible combination:

the type of each element is chosen from the group including:
  solar panel;

radiator;
  payload;
the module includes a plurality of solar panels arranged around the payload in a first plane;
preferably, the first plane being intended to be oriented toward the Sun;
the module includes a plurality of radiators arranged in a second plane perpendicular to the first plane;
preferably, the second plane being intended to be aligned with the nadir of the Earth;
the radiators are arranged substantially facing the payload and at a distance from it;
the flat shape is able to be inscribed in a circle presenting a cross-section of a loading compartment of a space launcher;
the flat shape presents identical dimensions for all elements;
the payload includes a data storage and processing server and means of communication of these data with another space module of the same space platform and/or with an external communication station;
the payload further includes a heat pump to dissipate heat;
each solar panel includes a frame and a membrane stretched over this frame and presenting printed solar cells;
  preferably, the frame being made of carbon-epoxy;
  preferably, the membrane being made of polyetheretherketone (PEEK);
at least some of the elements are connected by connection interfaces, hinges, and/or springs;
the module being devoid of an energy storage device.

The invention also has as its object a space platform including a plurality of modules as described above, the modules being assembled together.

The invention also has as its object a space platform formed of a plurality of identical space modules assembled together to form an elongated structure according to a platform axis, the structure presenting a substantially homogeneous mass distribution according to the platform axis.

According to other advantageous aspects of the invention, the platform includes one or more of the following features, taken alone or in any technically possible combination:

each space module includes a payload and is self-sufficient in energy and heat dissipation;
each module is deployable independently of the other modules;
each module includes a plurality of solar panels forming a first plane of the corresponding module;
  the modules being assembled so that their first planes form a useful plane of the platform;
the platform being intended to be placed in an orbit so that its useful plane is permanently oriented toward the Sun;
the platform being intended to be placed in an orbit so that the platform axis is oriented with the nadir of the Earth;
the platform presenting a structure in "I";
the platform further includes a robot able to displace on a surface of the platform and configured to deploy elements forming each module and/or to perform maintenance operations on the platform;
the platform further includes a mass able to displace on a surface of the platform and configured to control the attitude of the platform according to at least one axis;
the mass is configured to control the attitude of the platform at least in yaw;
the mass is a robot;
the platform includes at least one actuator/thruster either fixed or displaceable by a robot;

the structure presents a substantially homogeneous mass distribution in a useful plane formed of the platform axis and an axis perpendicular to this platform axis.

The invention also has as its object a method for deploying a space platform as defined above, including the following operations:

deployment of each space module constituting the platform;

assembly of the space modules together.

The invention also has as its object a method for piloting an elongated space platform according to a platform axis, the method including a phase of active control of the attitude of the platform by displacement of a mass on a control surface of the platform, the control surface extending according to the platform axis.

According to other advantageous aspects of the invention, the method includes one or more of the following features, taken alone or in any technically possible combination:

the active control of the attitude is performed relative to a single axis;

the active control of the attitude is a yaw control;

the method further includes a phase of passive control of the attitude by the Earth's gravity gradient;

the passive control of the attitude is a pitch and/or roll control;

the active control of the attitude of the platform is also performed by actuating one or more actuators/thrusters;

the mass is a deployment and/or maintenance robot;

the method further includes the displacement of one or more actuators/thrusters by the robot;

the control surface presents a substantially flat surface extending over the entire length of the platform.

The invention also has as its object a system for piloting a space platform, including technical means for implementing the method such as defined above.

BRIEF DESCRIPTION OF THE DRAWINGS

The invention will become clearer upon reading the following description, given solely by way of non-limiting example, and made with reference to the appended drawings on which:

FIGS. 5-7 are different views illustrating the implementation of a deployment method of the space module of FIG. 3 according to different embodiments of the invention.

DETAILED DESCRIPTION OF THE INVENTION

Figure 1:
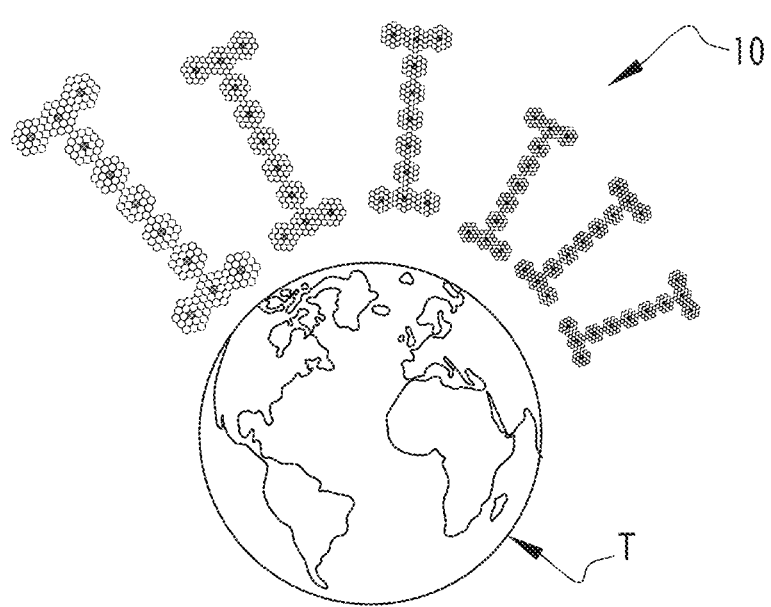
FIG. 1 is a schematic view of several positions of a space platform according to the invention relative to the Earth.

FIG. 1 illustrates several positions of a space platform 10 according to the invention.

These examples notably illustrate the positioning of the space platform 10 relative to the Earth T.

Thus, as illustrated in this figure, the space platform 10 is intended to be positioned in a terrestrial orbit so that at least one of the surfaces of this platform, hereinafter called the useful surface, is permanently exposed to the Sun. An example of such an orbit is a 6-18 hour SSO orbit at 1400 km altitude.

This platform 10 is, for example, intended to form a global data storage and processing server in space, also called a "data center".

To do this, the platform 10 communicates with terrestrial communication means to receive and transmit data as will be explained in more detail hereinbelow. This communication is done in some examples via intermediate communication means, such as a relay constellation between the platform 10 and the Earth. This solution allows minimizing the necessary ground infrastructure and directly reaches end users (mobile terminals, for example).

Alternatively, the space platform 10 presents any other space application requiring the use of large structures in space. In some examples, the space platform 10 presents several combined applications within the same structure.

Figure 2:
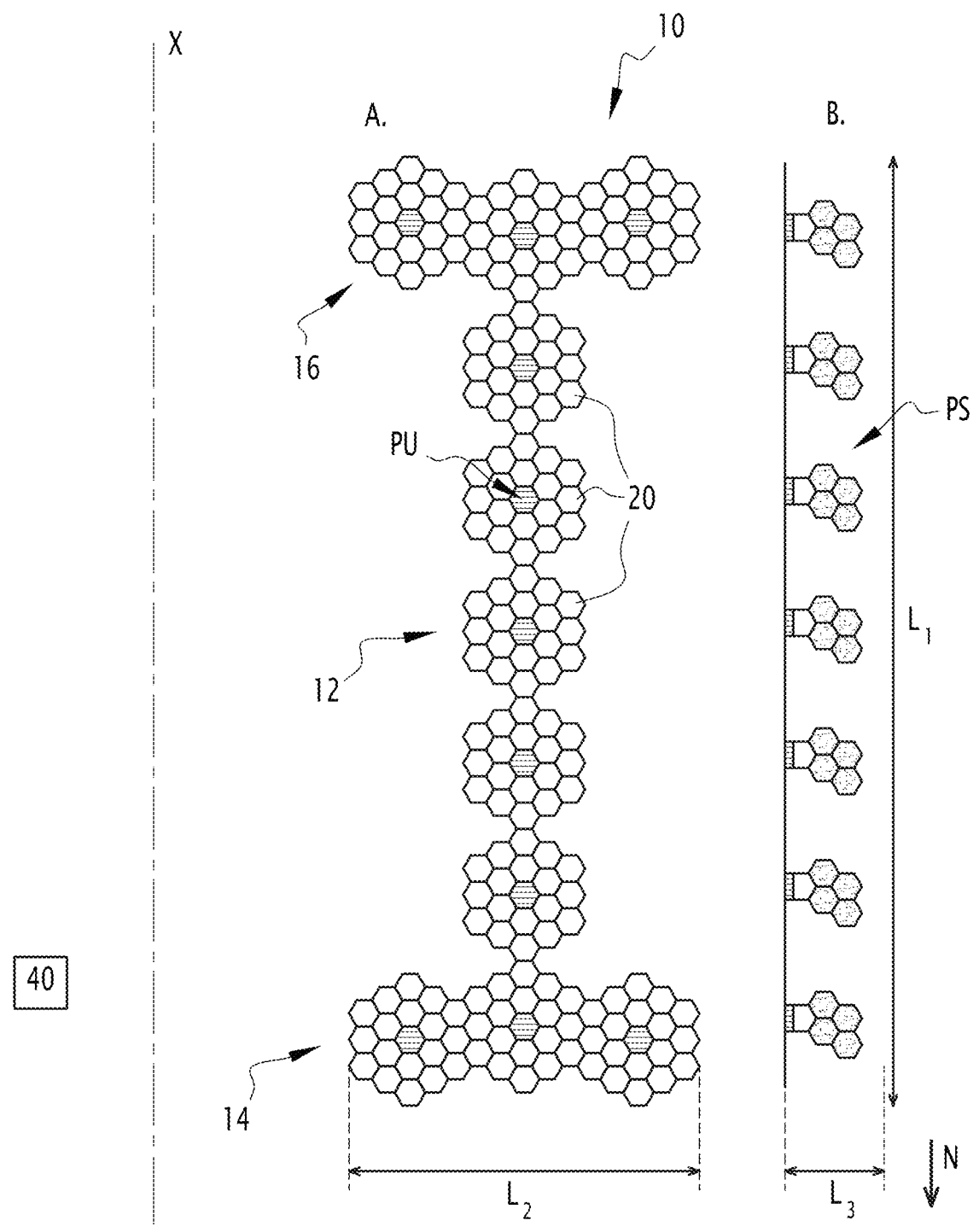
FIG. 2 is a detailed schematic front view (part A) and side view (part B) of the space platform of FIG. 1, the space platform including a plurality of space modules.

The space platform 10 is illustrated in more detail in FIG. 2.

Referring to this FIG. 2, the platform 10 extends according to a platform axis X which is aligned according to the nadir direction N of the Earth T.

More particularly, as visible in part A of FIG. 2 illustrating the space platform 10 from the front, this platform presents a structure in "I". In other words, the structure of the space platform 10 presents a main part 12 extending according to the platform axis X and two secondary parts 14, 16 extending perpendicularly to the platform axis X and positioned at each end of the main part 12.

Furthermore, the secondary parts 14, 16 are positioned symmetrically relative to a plane passing through the main part 12 at the center and extending according to the platform axis X.

For example, the space platform 10 presents an extent L1 according to the platform axis X between 200 and 300 m, preferably substantially equal to 210 m. Also, for example, the space platform 10 presents a perpendicular extent L2 to the platform axis X, which is between 60 and 90 m, for example, approximately equal to 80 m.

The space platform 10 forms a flat structure. Also, for example, the extent L3 presenting the thickness of this platform is between 10 and 20 m and is, for example, substantially equal to 11 m.

Of course, other dimensions are also possible for this platform 10. Furthermore, as will be explained in more detail hereinbelow, these dimensions may be modified during operation of the platform 10 for the addition and/or removal of space modules.

In general, the ratio between the thickness (in other words, the extent L3) of this platform 10 and its axial extent (in other words, the extent L1) is between $1/100$ and $1/10$.

The space platform 10 is formed of a plurality of identical space modules 20. These modules 20 are assembled together to form the structure of the platform such as illustrated in FIG. 2. For example, the main part 12 of the space platform 10 is formed of five space modules 20 then aligned according to the platform axis X. Each of the secondary parts 14, 16 is formed of three space modules 20 then aligned according to the axes perpendicular to the platform axis X.

The space modules 20 also present substantially a same mass so that the platform 10 presents a substantially homogeneous mass distribution according to the platform axis X and advantageously, in a useful plane PU such as defined below. By "substantially homogeneous" here is meant a homogeneous mass distribution at the scale of the space modules 20, that is, considering these space modules 20 within the platform 10 as points of mass.

The space modules 20 are interconnected to each other, to form a substantially rigid structure of the platform 10. The connection means may include clipping different parts forming these space modules 20 or then tightening or then screwing, as will be explained in more detail hereinbelow.

Advantageously, the space modules 20 are interconnected only structurally.

Alternatively, the space modules 20 are also interconnected by electrical cables and/or data exchange cables.

Advantageously, each space module 20 is self-sufficient in energy and heat dissipation. In other words, each space module 20 presents autonomy relative to the other modules within the same platform 10.

In some cases, the space modules 20 are interconnected to each other by wireless means in order to exchange data between them.

Even more advantageously, the different space modules 20 are added, removed, and/or replaced autonomously after the space platform 10 is put into orbit. In other words, these operations do not affect the operation of the other space modules 20.

Figure 3:
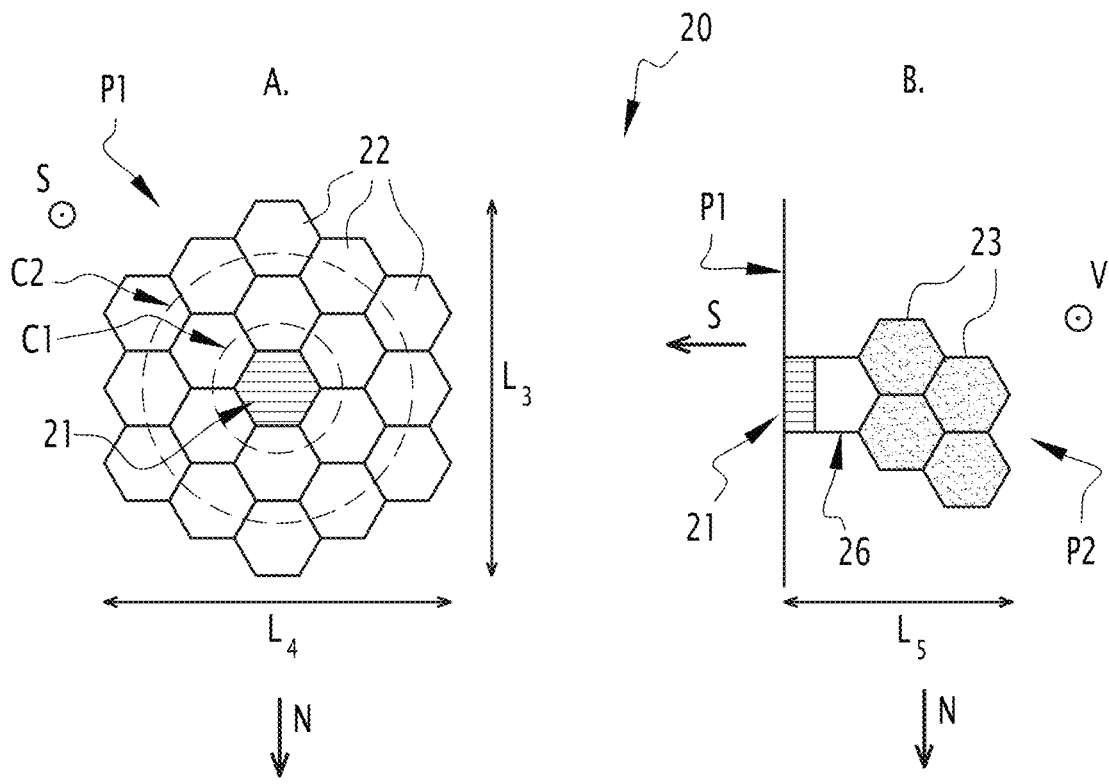
FIG. 3 is a detailed front view (part A) and side view (part A) of one of the space modules of FIG. 2.

An example of a space module 20 is illustrated in more detail in FIG. 3.

Referring to this FIG. 3, the space module 20 is formed of a predetermined number of elements 21, 22, 23 assembled to each other to form a first plane P1 visible when the module 20 is viewed from the front (part A of FIG. 3), and a second plane P2 visible when the space module 20 is viewed from the side (part B of FIG. 3). The second plane P2 is perpendicular to the first plane P1.

When the space modules 20 are assembled within the space platform 10, their first planes P1 form a single plane also called the useful plane PU. This useful plane then corresponds to the useful surface of the space platform 10 such as described previously. In particular, the useful plane PU formed of the planes P1 is permanently oriented toward the Sun.

As for the second planes P2, as illustrated in FIG. 3, those belonging to the space modules 20 of the main part 12 and the space modules 20 arranged in the center of the secondary parts 14, 16 also form the same plane, which is perpendicular to the useful plane PU. This plane is hereinafter called the secondary plane PS. The secondary plane PS then remains permanently in the shadow of the useful plane PU. The second planes P2 of the space modules 20 belonging to the ends of the secondary parts 14, 16 form planes, parallel to the secondary plane PS. These parallel planes also remain in the shadow of the useful plane PU.

Returning to the description of FIG. 3, the space module 20 includes a predetermined number of elements all having the same flat shape in the first plane P1.

Each element 21, 22, 23 is of a predetermined type. In other words, the space module 20 includes only elements the type of which is predetermined. Advantageously, the type of each element is chosen from among three predetermined types, namely a solar panel, a radiator, and a payload.

In the example of FIG. 3, the element 21 arranged in the center of the first plane P1 forms a payload. The elements 22 arranged around the payload 21 form the solar panels 22. Finally, the elements 23 arranged in the second plane P2 form radiators.

Figure 4:
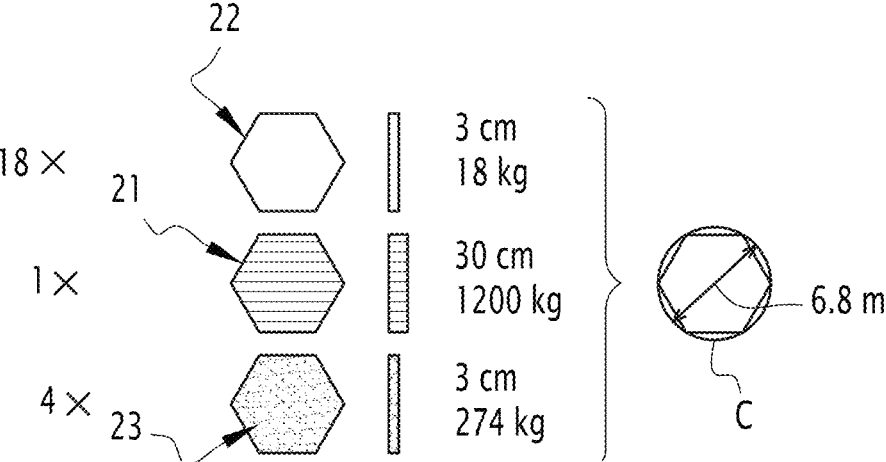
FIG. 4 is a schematic view illustrating an example of the composition of the space module of FIG. 3.

Referring to FIG. 4, for example, the space module 20 includes a single payload 21, eighteen solar panels 22, and four radiators 23.

The elements 21, 22, 23 of the space module 20 all form the same shape, which is, for example, hexagonal.

More generally, these elements 21, 22, 23 present a shape that is inscribed in a circle C representing a cross-section of a loading compartment of a space launcher, such as the fairing of this launcher.

Advantageously, this shape is adapted to be optimally inscribed in this circle C while having rectilinear faces allowing the attachment of these elements to other elements. Preferably, each element 21, 22, 23 presents a shape of a regular polygon with a number n of sides greater than or equal to 5. Advantageously, the number n of sides is equal to 6. This shape facilitates the assembly of the elements to form a space module and the assembly of the modules to each other to form the platform 10.

Furthermore, the elements 21, 22, 23 all present the same dimensions in the first plane P1. In other words, only the thickness of these elements varies.

Advantageously, elements of the same type present the same thickness as illustrated in FIG. 4. In particular, the solar panels 22 and the radiators 23 present a thickness substantially equal to 3 cm, while the payload 21 presents a thickness substantially equal to 30 cm.

The payload 21, for example, presents a housing including a plurality of electronic components.

The electronic components are notably chosen depending on the given application of the space platform 10.

For example, the electronic components include a data storage server and communication means. These communication means present, for example, local communication means with the payload of other space modules 20 or external communication means, for example, with a ground station or any other external communication station such as a satellite.

The payload 21 advantageously includes a heat pump allowing to dissipate the heat accumulated in the housing forming the payload 21.

In some embodiments, the payload 21 includes any other element implementing operation of the space module 10 or the space platform 10.

The solar panels 22 are arranged around the payload 21 as illustrated in FIG. 3. In particular, the solar panels 22 form two circles C1, C2 around the payload 21. The first circle C1 forming an inner circle is constituted of six solar panels 22, and the second circle C2 forming an outer circle is constituted of twelve solar panels 22.

Each solar panel 22 includes a frame made, for example, of carbon epoxy and a membrane stretched over the frame and made, for example, of polyetheretherketone (PEEK).

The frame presents a predetermined shape profile (for example, an "H") allowing, for example, to guide electrical supply cables at the periphery of each solar panel. The frame also presents means of attachment to other elements of the same space module 20 or another space module 20, in other words, to other solar panels and/or possibly to the payload 21. The means of attachment include clipping means (using, for example, bayonet systems), screwing, or then hinges.

The membrane stretched over the frame advantageously presents solar cells or forms a support for these cells, for example, printed on them.

These solar cells are of a predetermined type (for example, Perovskite type) allowing to generate electrical energy according to known methods. The solar cells are connected by the cables guided by the structural frame with the other solar panels in order to power the payload 21. In some cases, the payload 21 further includes a power transformer to transform the electrical energy delivered by the solar panels 22 into usable electrical energy to power the various electrical components of this payload 21. For example, this power transformer transforms the power from 400 V to 48 V.

The frame of the solar panels 22 allows the membrane to be stretched with a desired tension, for example, by a system of rods, pulleys, and cables, possibly passively, by playing on the differential expansion of materials to generate the tension force. Advantageously, the membranes are relaxed during launch of the launcher so as not to be damaged by acoustic waves during the launch.

The membranes stretched in the frame of the solar panels 22 advantageously form the first plane P1 of the space module 20, such as described previously.

The radiators 23 are arranged in the second plane P2, advantageously away from the payload 21.

Furthermore, these radiators 23 are arranged facing the payload 21 in order to conduct heat generated by this payload. To distance the radiators 23 from the payload 21, a spacing frame 26 is used.

The arrangement of the radiators 23 in the second plane P2 aligned with the nadir direction N of the Earth and perpendicular to the first plane P1 allows to minimize the exposure of these radiators 23 to the infrared flux of the Earth. Moreover, distancing the radiators 23 away from the payload 21 allows minimizing infrared irradiation by the payload 21. This ensures their optimal operation.

Referring to FIG. 3, the space module 20 presents in the first plane P1 a first extent L3 aligned with the platform axis X and a second extent L4 perpendicular to this axis. Each of these extents is, for example, between 20 and 30 m. Advantageously, the first extent L3 is approximately equal to 29 m, and the second extent L4 is advantageously equal to 27 m.

Furthermore, the space module 20 also presents a thickness L5, which is, for example, between 10 and 20 m and is, for example, substantially equal to 11 m. In other words, the thickness L5 of the space module 20 forms the thickness of the space platform 10.

FIG. 4 also provides approximate masses of the different elements forming the space module 20.

Thus, in the example of FIG. 4, the mass of the payload 21 is substantially equal to 1200 kg, the mass of each solar panel 22 is advantageously equal to 18 kg, and the mass of each radiator 23 is substantially equal to 274 kg.

The different elements of the space module 20 are advantageously configured to be stacked on top of each other in the space launcher and then deployed in space. Thus, the elements constituting the space modules 20 of the space platform 10 are stacked on top of each other so that the stack is carried in the same carrier and then deployed in space.

Advantageously, the heaviest elements, such as the payload 21, are stacked first (in the lower position). Then, the less heavy elements, such as the radiators 23, are stacked above, and then the least heavy elements, such as the solar panels 22, are stacked above to minimize the bending of the stack during launch and thus facilitate the piloting of the launcher.

In general, the stacking method depends on the manner in which these different elements in space are deployed.

Figure 6:
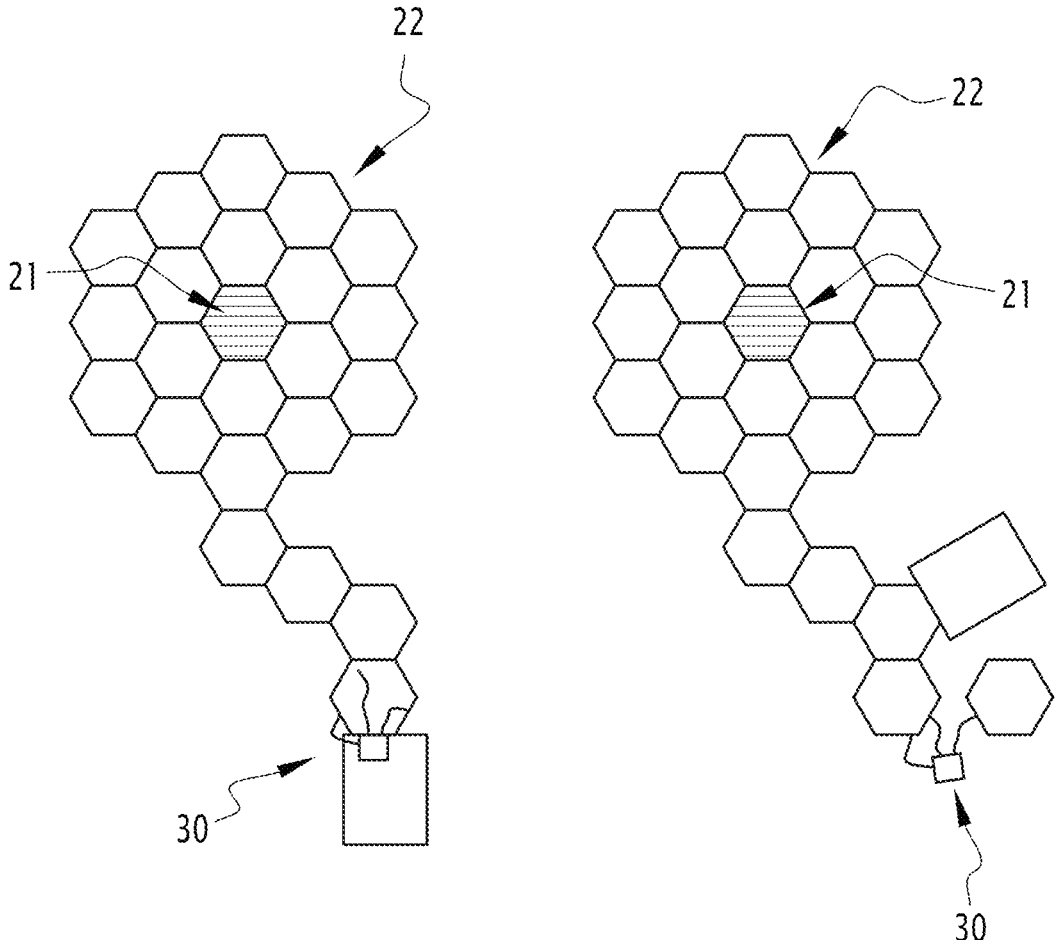
Figure 7:
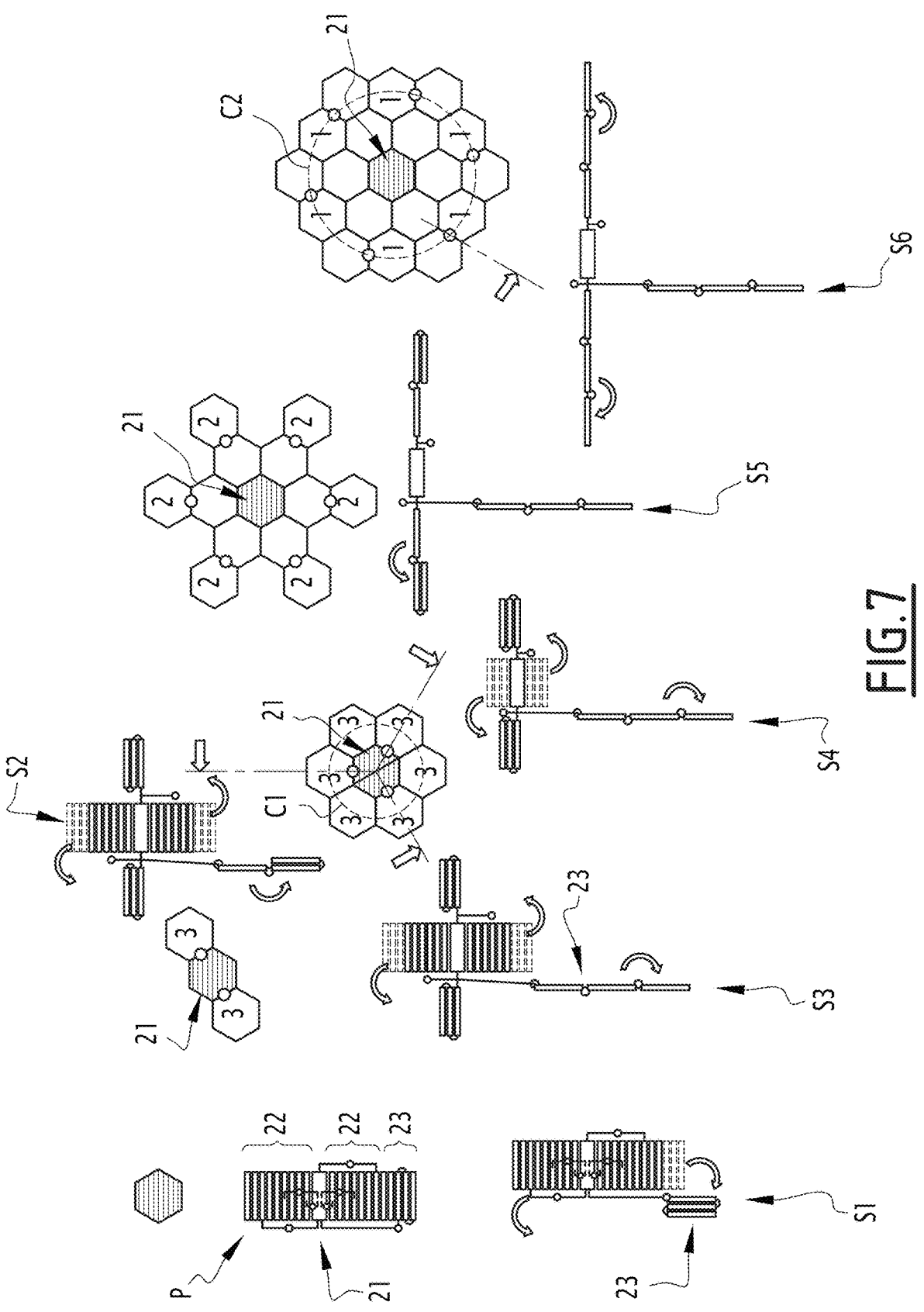

Subsequently, a method for deploying the space modules 20 will be described with reference to FIGS. 5-7, presenting different embodiments of this deployment method.

According to a first embodiment, all the elements or at least the payload 21 and the solar panels 22 are chained together to be deployed in a spiral as illustrated in FIG. 5.

In particular, according to this embodiment, the payload 21 constitutes the first element of the stack, which is then positioned at the beginning of the deployment process.

The payload 21 is connected to one of the adjacent solar panels 22, for example, by hinges or springs.

Thus, the stack constituted of the solar panels 22 is rotated to position this first solar panel 22 in a manner adjacent to the payload 21. The deployment of the solar panels 22 is thus continued in a spiral, first of all, forming the first circle C1 around the payload 21 and then the second circle C2 around this payload 21.

Furthermore, during deployment, adjacent elements are connected, for example, by clipping or screwing or tightening or any other possible means of attachment.

This type of deployment is, for example, performed in an autonomous manner by the space module 20 itself by using motorized hinges or by a robot as explained above.

The radiators 23 are attached behind the solar panels 22 and the payload 21 in a similar manner.

According to a second embodiment of the deployment method illustrated in FIG. 6, a robot 30 is used.

This robot 30 allows, for example, unfolding the stack of different elements constituting the space modules 20 by taking the elements of the stack one by one and positioning them in an appropriate manner. In this case, the assembly of each space module 20 is also performed in a spiral, starting this time with the outer circle C2 and going toward the center to position the payload 21. Alternatively, the deployment is started with the payload 21 and then by positioning the solar panels 22 in a spiral as in the previous case.

The robot 30 also attaches the different space modules 20 together or, after finishing the assembly of a space module 20, proceeds to assembly of an adjacent space module 20.

Advantageously, the robot 30 is configured to displace, for example, on a surface of the different space modules 20, for example, on the first plane P1 of these modules 20.

For this, the robot 30 has means of attachment to this first plane P1, constituted, for example, of magnets or any other available means. Alternatively, the robot 30 uses rails formed, for example, by the frames of the solar panels 22 to displace along the first planes P1 of the different space modules 20.

In addition, or alternatively, the robot 30 presents several arms (for example, 3 or 4). Each arm includes at its end clamps to grasp structural elements. Advantageously, the robot 30 is powered by electricity by means of these structural elements, which benefit from contacts positioned periodically on the path taken by the robot on the platform 10. The clamps of the robot 30 therefore have, facing, electrical contacts. Thus, in some examples, the robot 30 does not need batteries.

After deployment, the robot 30 is used for maintenance of the space platform 10 or for piloting this platform 10 as will be explained in more detail later.

FIG. 7 illustrates a third embodiment of the deployment method of the space module 20.

According to this embodiment, the stack P forming the space module 20 presents a particular stacking order and connections.

According to this embodiment, the solar panels 22 are classified into two groups, and each group is connected to the payload 21. The stack P thus formed first includes the radiators 23 at the bottom of the stack with a connection to the payload 21, then the first group of solar panels 22 also connected to the payload 21, then the payload 21 itself, and finally, at the top of the stack P, the second group of solar panels 22 also connected to the payload 21.

Each group of solar panels 22 includes a plurality of triplets. Each triplet includes solar panels connected to each other in a consecutive manner and thus defines solar panels of 3 rows. The solar panels of row 3 are directly connected to the payload 21, the solar panels of row 2 are connected to those of row 3, and the solar panels of row 1 are directly connected to those of row 2. These connections are, for example, formed by hinges, advantageously motorized.

In the example of FIG. 7, each group includes 3 triplets of solar panels 22.

During a first operation S1 of the deployment method, the radiators 23 are removed from the stack using the corresponding connection.

Then, during a second operation S2 of the method, the radiators 23 are partially opened, and a first pair of triplets from different groups are opened on either side of the payload 21.

Then, during a third operation S3, the radiators 23 are fully opened, and a second pair of triplets from different groups are opened on either side of the payload 21.

Then, during the fourth operation S4, a third pair of triplets from different groups are opened on either side of the payload 21.

Thus, at the end of this operation, the solar panels 22 of row 3 form the first circle C1 around the payload 21.

During a fifth operation S5, each triplet is partially unfolded, thus positioning the solar panels of row 2 in a manner adjacent to those of row 3.

Finally, during a sixth operation S6 of this method, each triplet is fully unfolded, thus positioning the solar panels of row 1 in a manner adjacent to those of row 3 and row 2.

Thus, the second circle C2 constituted of solar panels of rows 1 and 2 is closed.

Of course, during this deployment method, the deployment of the radiators 23 and the solar panels 22 may be executed independently.

Furthermore, in some embodiments of the deployment method, different space modules 20 are deployed in an independent manner. In such a case, the method also includes an operation of connecting different modules together. For this, the robot 30 as defined previously is used.

Figure 8:
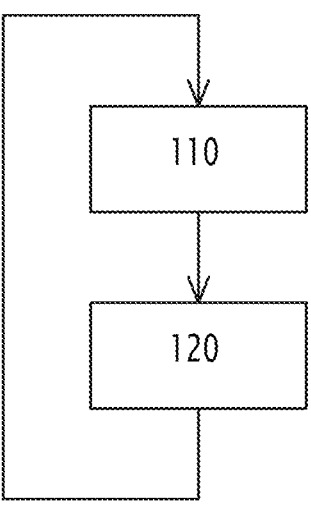
FIG. 8 is a flowchart of a method for piloting the space platform of FIG. 2.

A method for piloting the space platform 10 will now be explained with reference to FIG. 8, presenting a flowchart of its operations.

In particular, this method includes a phase of active control of the attitude of the space platform 10 and a phase of passive control of its attitude.

The active control phase is, for example, implemented by a piloting system 40.

This piloting system 40, for example, presents an electronic component embedded in the platform 10. For example, this piloting system 40 is part of one of the payloads 21 of the space modules 20 constituting the space platform 10.

Alternatively, the piloting system 40 is remote. It is, for example, implemented in a ground station or any other remote station, and the corresponding commands are transmitted to the space platform 10 using communication means known per se.

The active control phase of the attitude of the space platform 10 includes a first operation 110 of displacing a mass on a control surface of the space platform 10.

Advantageously, the control surface is formed of the useful plane PU of this platform, as explained previously.

The mass is, for example, formed by the robot 30 such as explained previously. This robot 30 is then able to displace along the useful plane PU of the space platform and thus modify the mass distribution on this space platform 10. This displacement creates a control torque by actively positioning the center of mass relative to the point of application of forces (mainly from the solar flux).

In some examples, the mass is formed or includes elements displaceable by a pulley system or a fluid displaceable by a fluid system. In these cases, such a system complements the robot 30.

Furthermore, in some cases, the robot 30 is also configured to, if necessary, displace the peripheral solar panels 22 to create larger torques, notably in case of repairs that would mobilize it and/or prevent it from creating a control torque.

According to different embodiments of the invention, the robot 30 is used only for piloting the space platform or, in addition to this piloting, for maintenance and/or deployment of the platform 10, as explained previously.

Advantageously, active control of the attitude is performed relative to a single axis. For example, active control of the attitude is performed only in yaw, thanks in particular to the structure in I of the platform 10.

Thus, the piloting system 40 measures rotation of the space platform according to the axis and compensates for this yaw rotation by displacing the robot 30 on the useful plane PU of the space platform 10.

In some embodiments, the active control phase of the attitude of the space platform 10 also includes a second operation 120, which includes actuating one or more actuators or thrusters arranged on the space platform 10.

Before implementing this operation 120, the piloting module 40 also actuates the robot 30 to appropriately displace one or more actuators/thrusters, for example, in the useful plane PU of the space platform 10. Then, the piloting system 40 determines a necessary propulsion value for each actuator/thruster depending on its positioning vis-a-vis the space platform 10.

The passive control phase of the attitude of the space platform 10 is performed in an inherent manner thanks to the local gravitational gradient of the Earth's potential.

In particular, this passive control of the attitude includes a pitch and roll control of the space platform 10. In other words, the space platform 10 presents natural stability in pitch and roll.

Of course, the piloting method may include complementary active control in attitude according to two or three axes.

For this, one or more robots are used simultaneously to displace in different planes of the space platform 10.

It is then understood that the present invention presents several advantages.

First of all, the invention optimizes space in the launcher fairing. This is achieved by the particular shape of the elements constituting the space platform and notably the space modules forming this platform. This shape is identical for all elements and also presents the same dimensions in their respective extension planes. Thus, a single heavy launcher carries all the elements necessary to deploy the space platform.

The invention also optimizes the mass of the space platform.

In particular, the space platform does not require a battery for its operation because the solar panels point permanently toward the Sun thanks to a particular orbit.

In addition, the solar panels are particularly light given the particular choice of materials constituting them and the architecture in a membrane stretched by a frame.

Furthermore, use of a heat pump allows the calories generated by the payload to be dissipated. This solution minimizes the cooling surface required by the radiators.

Thus, the number of radiators is reduced while ensuring the necessary cooling of the payload.

Furthermore, the radiators are arranged in an optimal manner, in the shadow of the solar panels and have very little exposure to the Earth's infrared flux. The radiators thus operate under optimal conditions, and their surface is therefore minimized.

Finally, the structural bending forces induced by the solar wind are minimized thanks to a distribution of the wing load over the entire surface exposed to the Sun of this large platform. This then minimizes the mass of structural reinforcements between the different space modules constituting the space platform.

The invention also minimizes the different types of losses.

In particular, the space platform according to the invention is constituted of all identical modules, self-sufficient in power and dissipation. Furthermore, the dimensions of each module are optimal to minimize electrical and thermal power losses.

The invention also embodies different deployment options.

These options include, for example, deploying the elements constituting each space module using motorized hinges. Another option is embodied using an indigenous robot. Finally, another deployment option is embodied by assembling the hexagonal elements individually.

The invention also presents internal advantages of modularity and extensibility.

In particular, the different space modules are added later to increase the size of the platform.

Furthermore, piloting of the platform is carried out in a particularly simple manner. In particular, the stability according to at least two axes is ensured by the Earth's gravity gradient.

This allows for a gain in mass of the actuators/thrusters necessary for control and avoids their consumption of propellant.

Moreover, the invention embodies active yaw control by adjusting the center of mass relative to the solar pressure center. Thus, a movable mass such as an indigenous robot adjusts its position to generate or neutralize torques by adjusting the distances between the center of mass and the resulting point of application of solar radiation pressure forces.

The invention claimed is:

1. A space module deployed in space to form a space platform, the space module comprising a predetermined number of elements all having the same flat shape in an extension plane of the corresponding element, with at least one element forming a payload, at least some elements forming a plurality of solar panels arranged around the payload in a frontal plane, and at least some elements forming a plurality of radiators arranged substantially behind the payload in a second plane perpendicular to the frontal plane.

2. The module according to claim 1, wherein the first plane is oriented towards the Sun.

3. The module according to claim 1, wherein at least some of said elements comprise a plurality of radiators arranged in a second plane perpendicular to the first plane.

4. The module according to claim 3, wherein the second plane is aligned with the nadir of the Earth.

5. The module according to claim 1, wherein the flat shape is able to be inscribed in a circle presenting a cross-section of a loading compartment of a space launcher.

6. The module according to claim 1, wherein the flat shape presents identical dimensions for all the elements.

7. The module according to claim 1, wherein the payload comprises:

a data storage;

a processing server; and a communicator communicating data with another space module of the same space platform and/or with an external communication station.

8. The module according to claim 7, wherein the payload further comprises a heat pump to dissipate heat.

9. The module according to claim 1, wherein each solar panel comprises:

a frame; and a membrane stretched over this frame and presenting printed solar cells.

10. The module according to claim 9, wherein said frame is made of carbon-epoxy.

11. The module according to claim 9, wherein said membrane is comprised of polyetheretherketone (PEEK).

12. The module according to claim 1, wherein at least some of said elements are connected by connection interfaces, hinges, and/or springs.

13. The module according to claim 1, devoid of an energy storage device.

14. A space platform comprising a plurality of modules according to claim 1, the modules being assembled together.

* * * * *